United States Patent
Birnbaum et al.

(10) Patent No.: US 10,437,341 B2
(45) Date of Patent: Oct. 8, 2019

(54) SYSTEMS AND METHODS FOR USER GENERATED CONTENT AUTHORING

(71) Applicant: Immersion Corporation, San Jose, CA (US)

(72) Inventors: David M. Birnbaum, Oakland, CA (US); Christopher J. Ullrich, Ventura, CA (US); Robert Lacroix, San Jose, CA (US); Satvir Singh Bhatia, San Jose, CA (US); Michael Powell, Santa Clara, CA (US); Stephen D. Rank, San Jose, CA (US); Iva Segalman, Santa Clara, CA (US); Amaya Weddle, San Jose, CA (US); Paige Raynes, Walnut Creek, CA (US)

(73) Assignee: Immersion Corporation, San Jose, CA (US)

( * ) Notice: Subject to any disclaimer, the term of this patent is extended or adjusted under 35 U.S.C. 154(b) by 1086 days.

(21) Appl. No.: 14/596,569

(22) Filed: Jan. 14, 2015

(65) Prior Publication Data

US 2015/0199024 A1 Jul. 16, 2015

Related U.S. Application Data

(60) Provisional application No. 61/928,357, filed on Jan. 16, 2014.

(51) Int. Cl.
*H04N 21/472* (2011.01)
*G06F 3/01* (2006.01)
(Continued)

(52) U.S. Cl.
CPC .............. *G06F 3/017* (2013.01); *G06F 3/016* (2013.01); *G06F 3/0346* (2013.01);
(Continued)

(58) Field of Classification Search
CPC ........ G06F 3/017; G06F 3/016; G06F 3/0488; G06F 3/0346; G06F 2203/014;
(Continued)

(56) References Cited

U.S. PATENT DOCUMENTS 8,866,788 B1 10/2014 Birnbaum et al.
2008/0223627 A1* 9/2008 Lacroix .................. G06F 3/016
178/18.01

(Continued)

FOREIGN PATENT DOCUMENTS

CN 101391146 3/2009
CN 102159290 8/2011
(Continued)

OTHER PUBLICATIONS

European Patent Office Application No. 15151346.2, Communication Pursuant to Article 94(3)EPC dated Dec. 9, 2016, 6 pages.
(Continued)

*Primary Examiner* — Rinna Yi
(74) *Attorney, Agent, or Firm* — Kilpatrick Townsend & Stockton LLP (57) ABSTRACT

Systems and methods for user generated content authoring are disclosed. One illustrative method disclosure herein includes: receiving a video signal; displaying a user interface associated with haptic authoring; detecting a gesture associated with a haptic effect; determining a haptic effect based in part on the gesture; associating the haptic effect with a location in the video signal; and storing the video signal and the associated haptic effect.

16 Claims, 7 Drawing Sheets

(51) Int. Cl.
  G11B 27/031    (2006.01)
  G06F 3/0488    (2013.01)
  G11B 27/10     (2006.01)
  G06F 3/0346    (2013.01)
  H04N 21/854    (2011.01)
  H04N 21/414    (2011.01)
  H04N 21/43     (2011.01)
  H04N 21/433    (2011.01)

(52) U.S. Cl.
  CPC .......... *G06F 3/0488* (2013.01); *G11B 27/031* (2013.01); *G11B 27/10* (2013.01); *H04N 21/41407* (2013.01); *H04N 21/4307* (2013.01); *H04N 21/4334* (2013.01); *H04N 21/47205* (2013.01); *H04N 21/854* (2013.01); *G06F 2203/014* (2013.01)

(58) Field of Classification Search
  CPC ............. G11B 27/10; H04N 21/41407; H04N 21/4307; H04N 21/47205; H04N 1/854
  USPC ........................................................ 715/702
  See application file for complete search history.

(56) References Cited

U.S. PATENT DOCUMENTS

| | | | |
|---|---|---|---|
| 2009/0079690 A1 | 3/2009 | Watson et al. | |
| 2009/0325645 A1* | 12/2009 | Bang | G06F 3/016 455/566 |
| 2010/0013653 A1 | 1/2010 | Birnbaum et al. | |
| 2010/0033426 A1 | 2/2010 | Grant et al. | |
| 2011/0133910 A1* | 6/2011 | Alarcon | A61H 19/32 340/407.1 |
| 2011/0244963 A1 | 10/2011 | Grant et al. | |
| 2011/0264491 A1 | 10/2011 | Birnbaum et al. | |
| 2012/0210200 A1* | 8/2012 | Berger | G06F 3/0481 715/202 |
| 2012/0229400 A1 | 9/2012 | Birnbaum et al. | |
| 2012/0301111 A1* | 11/2012 | Cordova | H04N 9/8205 386/245 |
| 2013/0106691 A1 | 5/2013 | Rank | |
| 2014/0085414 A1 | 3/2014 | Zhou et al. | |
| 2014/0198068 A1* | 7/2014 | Lee | G06F 3/04886 345/173 |
| 2014/0300454 A1 | 10/2014 | Lacroix et al. | |
| 2014/0380380 A1 | 12/2014 | Heller et al. | |

FOREIGN PATENT DOCUMENTS

| | | |
|---|---|---|
| CN | 102227694 | 10/2011 |
| CN | 102822772 | 12/2012 |
| CN | 102906667 | 1/2013 |
| CN | 103003775 | 3/2013 |
| CN | 103257783 | 8/2013 |
| EP | 1 758 398 A1 | 2/2007 |
| JP | 2000250689 | 9/2000 |
| JP | 2008/090859 A1 | 7/2008 |
| JP | 2008-165768 A | 7/2008 |
| JP | 2011528476 | 11/2011 |
| WO | 2006056901 | 6/2006 |

OTHER PUBLICATIONS

European Patent Office Application No. 15151346.2, Extended European Search Report dated Jun. 22, 2015, 6 pages.
Fabien Danieau, J_er_emie Bernon, Julien Fleureau, Philippe Guillotel, Nicolas Mollet, et al.. H-Studio: An Authoring Tool for Adding Haptic and Motion E_ects to Audiovisual Content (Demonstration). 26th ACM Symposium on User Interface Software and Technology—UIST 2013, Oct. 2013, St Andrews, United Kingdom.
European Patent Office Application No. 1515346.2, Summons to Attend Oral Proceedings Pursuant to Rule 115(1) EPC dated Sep. 8, 2017, 7 pages.
JP 2015-005703, "Office Action", dated Jul. 3, 2018, 5 pages.
Chinese Application No. CN201510097741.0 , "Office Action", dated Mar. 5, 2019, 15 pages.
Chinese Application No. CN201510097741.0 , "Office Action", dated Sep. 3, 2018, 19 pages.
Japanese Application No. JP2015-005703 , "Notice of Decision to Grant", dated Mar. 26, 2019, 3 pages.
Japanese Application No. JP2015-005703 , "Office Action", dated Oct. 23, 2018, 2 pages.
European Application No. EP18198360.2 ,"Extended European Search Report", dated Jan. 25, 2019, 9 pages.
Chinese Application No. CN201510097741.0 ,"Office Action", dated Jun. 26, 2019, 14 pages.

\* cited by examiner

SYSTEMS AND METHODS FOR USER GENERATED CONTENT AUTHORING

CROSS REFERENCE TO RELATED APPLICATION

This application claims priority to Provisional Application No. 61/928,357, filed on Jan. 16, 2014, and entitled "User Generated Content Authoring," the entirety of which is hereby incorporated by reference herein.

BACKGROUND

Touch-enabled devices have become increasingly popular. For instance, mobile and other devices may be configured with touch-sensitive displays so that a user can provide input by touching portions of the touch-sensitive display. As another example, a touch-enabled surface separate from a display may be used for input, such as a trackpad, mouse, or other device. Increasingly, videos may be displayed on these touch enabled devices. Further, these devices include processing capability for video creation and editing. Many devices are further equipped with haptic capability. Accordingly, there is a need for systems and methods for user generated content authoring.

SUMMARY

Embodiments of the present invention include devices featuring video display capability and capability to determine haptic signals and output haptic effects. In some embodiments, these haptic effects may comprise surface-based haptic effects that simulate one or more features in a touch area. Features may include, but are not limited to, changes in texture and/or simulation of boundaries, obstacles, or other discontinuities in the touch surface that can be perceived through use of an object in contact with the surface. In some embodiments haptic effects may comprise surface deformations, vibrations, and other tactile effects known in the art. In some embodiments these haptic effects may be used to simulate or enhance features within a video, for example, action effects or effects associated with sounds and/or actions occurring in the video.

In one embodiment, a method for content authoring comprises: receiving a video signal; displaying a user interface associated with haptic authoring; detecting a gesture associated with a haptic effect; determining a haptic effect based in part on the gesture; associating the haptic effect with a location in the video signal; and storing the video signal and the associated haptic effect.

In another illustrative embodiment a system for content authoring comprises: a display configured to receive a video signal and output a user interface associated with the video signal; a sensor configured to detect a gesture and transmit a sensor signal associated with the gesture; a processor in communication with the sensor and the display, the processor configured to: receive the sensor signal and determine a haptic effect based in part on the gesture; associate a haptic effect with a location in the video signal; and store the video signal and the associated haptic effect.

Another illustrative embodiment comprises a non-transitory computer readable medium comprising program code, which when executed by the processor is configured to cause the processor to: receive a video signal; transmit a display signal associated with a user interface associated with haptic authoring to a display; detect a gesture associated with a haptic effect; determine a haptic effect based on the gesture; associate the haptic effect with a location in the video signal; and store the video signal and the associated haptic effect.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Illustrative Example of a Device for User Generated Content Authoring

One illustrative embodiment of the present disclosure comprises an electronic device, such as a tablet, e-reader, mobile phone, or computer such as a laptop or desktop computer or wearable device. The electronic device comprises a display (such as a touch-screen display), a memory, and a processor in communication with each of these elements.

The illustrative device comprises a memory configured to store one or more recorded videos. These videos may comprise videos downloaded via a data connection from a remote data source, e.g., a database on the Internet. Alternatively, these videos may comprise videos captured by a user of the illustrative device. For example, the illustrative device may comprise a digital camera (e.g., a front or rear mounted camera on a mobile device), with which the user may capture digital images and videos. The illustrative device comprises sensors to detect a user gesture and based on the user gesture apply content to these videos. In some embodiments, the content may comprise user generated content. In some embodiments, the content may comprise haptic effects, graphics, sounds, or other types of content.

In the illustrative embodiment, the mobile device may comprise program code for content authoring according to embodiments disclosed herein. In the illustrative embodiment, this program code may comprise program code for displaying a user interface for content authoring. According to the illustrative embodiment, a user may capture a video by using a camera interface available in the content authoring user interface. For example, in one embodiment the user may capture a video of a cat using a camera associated with the device. Alternatively, the user may select a preexisting video available on a data store of the computing device or available via a network connection. For example, the user may select a preloaded video, e.g., a video of a skier.

In the illustrative embodiment, once the user selects a video, the user may apply haptic content to the video via the content authoring interface. In the illustrative embodiment, the user may apply haptic content by first selecting a location within the video. For example, in the illustrative embodiment, a portion of the display may comprise a sequence of frames from the video, with which the user may interact in order to select a location in the video associated with that frame. In the illustrative embodiment, once the user selects a location in the video, the user may then assign a haptic effect to that location. In some embodiments, the user may assign the haptic effect using a gesture, as described in further detail below.

In the illustrative embodiment the user may select one or more predefined haptic effects. These effects may comprise tactile effects, effects configured to simulate emotions, effects configured to simulate action, or other types of effects. In some embodiments the predefined haptic effects may comprise multi-dimensional haptic effects. For example, in some embodiments the haptic effects may comprise one or more of vibrations, surface based effects, surface deformations, or other haptic effects known in the art. Further, the user may modify features of these effects. For example, the user may assign duration, intensity, frequency, or any other feature to the haptic effect. In the embodiment discussed above, the user may assign a haptic effect to a video of a cat. The haptic effect may comprise a vibration configured to simulate the cat purring.

In some embodiments, the user may create a haptic effect. For example, the user may create a haptic effect by interacting with the device (e.g., shaking the device or pressing a location on the device). These gestures may be captured by one or more sensors on the mobile device and converted to a haptic effect. In some embodiments, the haptic output device(s) on the device may be configured to output a force in the X, Y, or Z plane with respect to the device. In some embodiments, these effects may be configured to simulate the feeling of an object on the display moving. For example, in one embodiment, a multidimensional haptic effect may be configured to simulate an object (such as a sticker applied as discussed below) moving in the X-plane (left or right), the Y-plane (up or down), the Z-plane (into or out of the display), or a vector in each of these planes. These haptic effects may be output by one or more of the different types of haptic output devices discussed in further detail below.

In some embodiments a user may create a multidirectional or multidimensional haptic effect. As discussed above, the device may comprise one or more sensors configured to detect movement of the mobile device (e.g., accelerometers, gyroscopes, cameras, GPS, or other sensors) and sensors configured to detect surface interaction. The user may make a gesture on the surface of the device (e.g., touch, tap, or swipe) the user may also make a gesture with the device (e.g., moving a device through space, tilting, turning, swinging, or spinning, the device etc.). These gestures may be captured by the sensors. The sensors may then transmit signals associated with the gestures to a processor. The processor may determine one or more haptic effects configured to simulate the gesture. For example, the processor may determine a haptic effect that outputs a force in the Z-plane to simulate a gesture that moved the device downward. Further, the processor may also determine a haptic effect to output in the X or Y planes (e.g., a surface based effect on the surface of a touch-screen) to simulate a gesture on the surface of the touch-screen.

Further, in the illustrative embodiment the device may determine a haptic effect based in part on data received from a camera (e.g., a front or rear facing camera on a mobile device). For example, in the illustrative embodiment, the user may make a gesture within the viewable range of the camera. The camera may capture this gesture and transmit a signal associated with the gesture to a processor. The processor may determine a haptic effect associated with the gesture. For example, the processor may determine a haptic effect configured to simulate the gesture. In some embodiments, the gesture may comprise a multi-dimensional gesture. In one such embodiment, the camera may capture a video of the user playing a game such as tennis. The processor may determine various gestures associated with the game (e.g., hand movements such as a forehand or backhand and foot gestures such as steps). The processor may determine haptic effects associated with these gestures. These haptic effects may be associated with a video of the user. Alternatively, these haptic effects may be associated with a haptic library and later selected for use in other applications or videos.

In some embodiments, the camera may capture gestures, determine haptic effects associated with those gestures, and then associate the haptic effect with a different video. For example, the camera may capture the user performing a gesture such as clapping hands. The processor may determine a haptic effect associated with this gesture. This new haptic effect may be stored in a haptic library of available haptic effects. Further, this new haptic effect may be associated with a video, e.g., a video of a downhill skier. For example, in such an embodiment, the haptic effect may be placed at locations in the video in which events occur, e.g., when the skier passes other skiers, impacts objects, turns, etc.

In the illustrative embodiment, after the user assigns a haptic effect, the user interface may display an indicator showing the location in the video at which the effect was assigned. For example, the sequence of frames from which the user selected the location to apply the haptic effect may comprise an overlay at the location of the haptic effect. Further, the overlay may be scaled to show the duration of the haptic effect by comparison to the length of the video.

In the illustrative embodiment, the user may further apply a sticker or tag to a location in the video. The sticker may comprise an animation or a graphic that was already created and available to the user via the content authoring interface. Alternatively, the sticker may comprise a graphic, animation, and/or audio effect created by the user. In the illustrative embodiment the user may apply the sticker to a location in the video by performing actions similar to those the user performed to apply a haptic effect to the video. For example, in the embodiment discussed above, the user may create a sticker that comprises a red tag with white lettering spelling "purr." The user may then assign this sticker to appear at the same time as the haptic effect simulating purring.

In some embodiments, the authoring interface may further comprise functionality to author an audio effect, for example, the user may select an existing audio effect or use an interface to create a new audio effect, e.g., with a microphone or with an audio application associated with the device. In the illustrative embodiment the user may apply the audio effect to a location in the video by performing actions similar to those the user performed to apply a haptic effect to the video.

In the illustrative embodiment, the user may apply multiple types of content, e.g., multiple haptic effects, audio effects, and stickers to many locations throughout the video. Once the user has finished applying content, the authoring application will store the video, haptic effects, audio effects, and stickers. In the illustrative embodiment, this data may be stored together in a single media file, e.g., an MP4 media file. Alternatively, each component may be stored separately in a file. For example, the video file may be stored in its original format, the audio file may be stored in its original format, and a haptic track comprising the haptic data may be stored separately.

In the illustrative embodiment, the user may then play the video file and feel the assigned haptic effects and see the assigned stickers. For example, in the embodiment discussed above, the user may play the video of a cat and when the video reaches the location at which a haptic effect was assigned the device may output the haptic effect. Further the device may output the sticker, e.g., in the embodiment discussed above, a sticker with the text "purr," And/or its associated audio effect. Further in the illustrative embodiment the user may send the video to other users, which may be able to view the video and feel the assigned haptic effects and see the sticker.

Illustrative Systems for User Generated Content Authoring

Figure 1A:
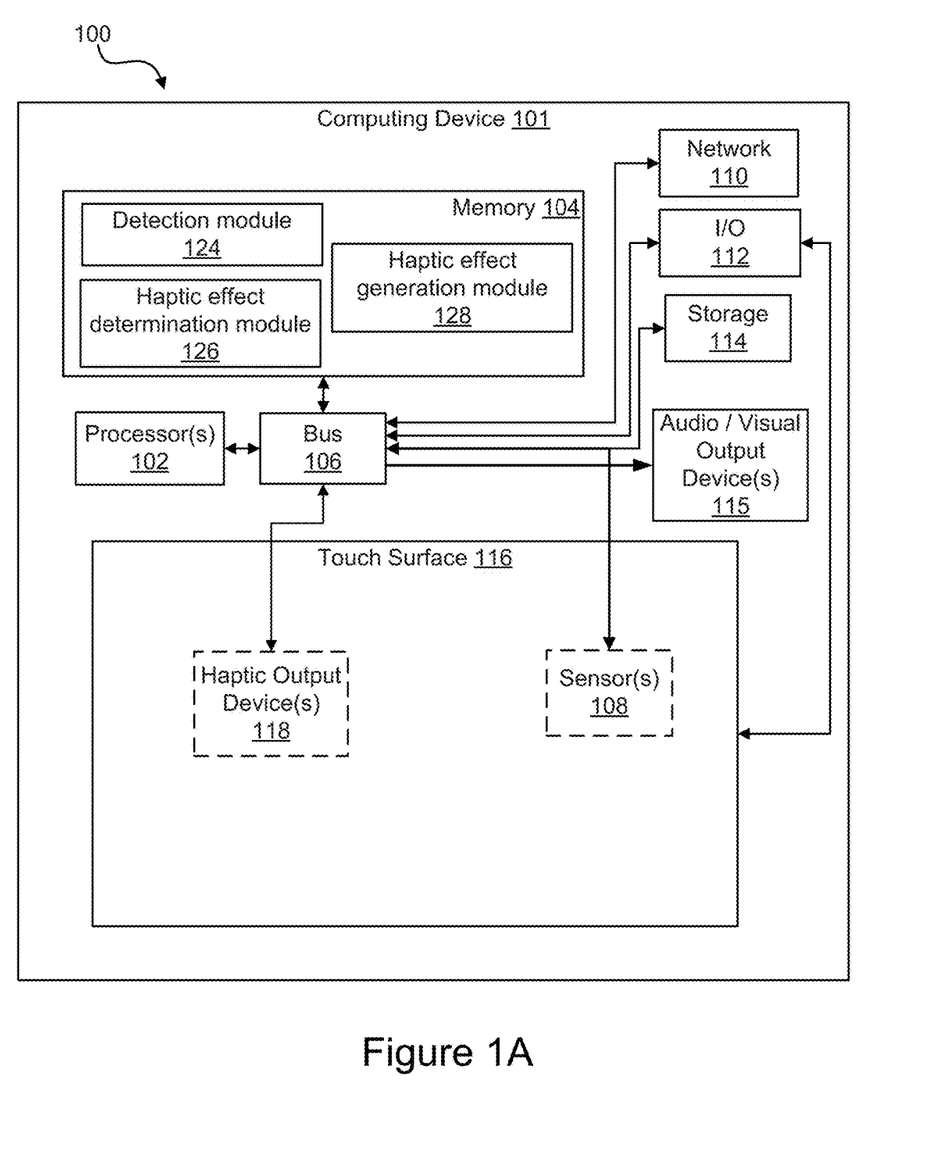
FIG. 1A shows an illustrative system for user generated content authoring.

FIG. 1A shows an illustrative system 100 for user generated content authoring. Particularly, in this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate connection to devices such as one or more displays, keyboards, mice, speakers, microphones, cameras (e.g., a front and/or a rear facing camera on a mobile device) and/or other hardware used to input data or output data. Storage 114 represents nonvolatile storage such as magnetic, optical, or other storage media included in device 101.

Audio/visual output device(s) 115 comprise one or more devices configured to receive signals from processor(s) 102 and provide audio or visual output to the user. For example, in some embodiments, audio/visual output device(s) 115 may comprise a display such as a touch-screen display, LCD display, plasma display, CRT display, projection display, or some other display known in the art. Further, audio/visual output devices may comprise one or more speakers configured to output audio to a user.

System 100 further includes a touch surface 116, which, in this example, is integrated into device 101. Touch surface 116 represents any surface that is configured to sense touch input of a user. One or more sensors 108 may be configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position. In some embodiments, sensor 108 and touch surface 116 may comprise a touch-screen or a touch-pad. For example, in some embodiments, touch surface 116 and sensor 108 may comprise a touch-screen mounted overtop of a display configured to receive a display signal and output an image to the user. In other embodiments, the sensor 108 may comprise an LED detector. For example, in one embodiment, touch surface 116 may comprise an LED finger detector mounted on the side of a display. In some embodiments, the processor is in communication with a single sensor 108, in other embodiments, the processor is in communication with a plurality of sensors 108, for example, a first touch screen and a second touch screen. In some embodiments one or more sensor(s) 108 further comprise one or more sensors configured to detect movement of the mobile device (e.g., accelerometers, gyroscopes, cameras, GPS, or other sensors). These sensors may be configured to detect user interaction that moves the device is the X, Y, or Z plane. The sensor 108 is configured to detect user interaction, and based on the user interaction, transmit signals to processor 102. In some embodiments, sensor 108 may be configured to detect multiple aspects of the user interaction. For example, sensor 108 may detect the speed and pressure of a user interaction, and incorporate this information into the interface signal. Further, in some embodiments, the user interaction comprises a multi-dimensional user interaction away from the device. For example, in some embodiments a camera associated with the device may be configured to detect user movements, e.g., hand, finger, body, head, eye, or feet motions or interactions with another person or object.

In some embodiments, the input may comprise a gesture. A gesture is any movement of the body that conveys meaning or user intent. It will be recognized that simple gestures may be combined to form more complex gestures. For example, bringing a finger into contact with a touch sensitive surface may be referred to as a "finger on" gesture, while removing a finger from a touch sensitive surface may be referred to as a separate "finger off" gesture. If the time between the "finger on" and "finger off" gestures is relatively short, the combined gesture may be referred to as "tapping;" if the time between the "finger on" and "finger off" gestures is relatively long, the combined gesture may be referred to as "long tapping;" if the distance between the two dimensional (x,y) positions of the "finger on" and "finger off" gestures is relatively large, the combined gesture may be referred to as "swiping;" if the distance between the two dimensional (x, y) positions of the "finger on" and "finger off" gestures is relatively small, the combined gesture may be referred to as "smearing," "smudging," or "flicking" Any number of two dimensional or three dimensional simple or complex gestures may be combined in any manner to form any number of other gestures, including, but not limited to, multiple finger contacts, palm or first contact, or proximity to the device. A gesture can also be any form of hand movement recognized by a device having an accelerometer, gyroscope, or other motion sensor, and converted to electronic signals. Such electronic signals can activate a dynamic effect, such as shaking virtual dice, where the sensor captures the user intent that generates a dynamic effect.

In this example, a haptic output device 118 in communication with processor 102 is coupled to touch surface 116. In some embodiments, haptic output device 118 is configured to output a haptic effect simulating a texture on the touch surface in response to a haptic signal. Additionally or alternatively, haptic output device 118 may provide vibrotactile haptic effects that move the touch surface in a controlled manner. Some haptic effects may utilize an actuator coupled to a housing of the device, and some haptic effects may use multiple actuators in sequence and/or in concert. For example, in some embodiments, a surface texture may be simulated by vibrating the surface at different frequencies. In such an embodiment haptic output device 118 may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA). In some embodiments, haptic output device 118 may comprise a plurality of actuators, for example an ERM and an LRA.

In some embodiments, one or more haptic output devices may be configured to output forces in the X, Y, or Z plane with respect to the device. In some embodiments, these effects may be configured to simulate the feeling of an object within the display moving. For example, in one embodiment, a multidimensional haptic effect may be configured to simulate an object (such as a sticker applied as discussed below) moving in the X-plane (left or right), the Y-plane (up or down), the Z-plane (into or out of the display), or vectors in these planes. These multi-dimensional haptic effects may simulate features.

Although a single haptic output device 118 is shown here, embodiments may use multiple haptic output devices of the same or different type to output haptic effects, e.g., to simulate surface textures on the touch surface. For example, in one embodiment, a piezoelectric actuator may be used to displace some or all of touch surface 116 vertically and/or horizontally at ultrasonic frequencies, such as by using an actuator moving at frequencies greater than 20-25 kHz in some embodiments. In some embodiments, multiple actuators such as eccentric rotating mass motors and linear resonant actuators can be used alone or in concert to provide different textures and other haptic effects.

In still other embodiments, haptic output device 118 may use electrostatic attraction, for example by use of an electrostatic surface actuator, to simulate a texture on the surface of touch surface 116. Similarly, in some embodiments haptic output device 118 may use electrostatic attraction to vary the friction the user feels on the surface of touch surface 116. For example, in one embodiment, haptic output device 118 may comprise an electrostatic display or any other device that applies voltages and currents instead of mechanical motion to generate a haptic effect. In such an embodiment, an electrostatic actuator may comprise a conducting layer and an insulating layer. In such an embodiment, the conducting layer may be any semiconductor or other conductive material, such as copper, aluminum, gold, or silver. And the insulating layer may be glass, plastic, polymer, or any other insulating material.

The processor 102 may operate the electrostatic actuator by applying an electric signal to the conducting layer. The electric signal may be an AC signal that, in some embodiments, capacitively couples the conducting layer with an object near or touching touch surface 116. In some embodiments, the AC signal may be generated by a high-voltage amplifier. In other embodiments the capacitive coupling may simulate a friction coefficient or texture on the surface of the touch surface 116. For example, in one embodiment, the surface of touch surface 116 may be smooth, but the capacitive coupling may produce an attractive force between an object near the surface of touch surface 116. In some embodiments, varying the levels of attraction between the object and the conducting layer can vary the simulated texture on an object moving across the surface of touch surface 116 or vary the coefficient of friction felt as the object moves across the surface of touch surface 116. Furthermore, in some embodiments, an electrostatic actuator may be used in conjunction with traditional actuators to vary the simulated texture on the surface of touch surface 116. For example, the actuators may vibrate to simulate a change in the texture of the surface of touch surface 116, while at the same time; an electrostatic actuator may simulate a different texture, or other effects, on the surface of touch surface 116 or on another part of the computing device 101 (e.g., its housing or another input device).

One of ordinary skill in the art will recognize that multiple techniques may be used to output haptic effects such as varying the coefficient of friction or simulating a texture on a surface. For example, in some embodiments, a texture may be simulated or output using a flexible surface layer configured to vary its texture based upon contact from a surface reconfigurable haptic substrate (including, but not limited to, e.g., fibers, nanotubes, electroactive polymers, piezoelectric elements, or shape memory allows) or a magnetorheological fluid. In another embodiment, surface texture may be varied by raising or lowering one or more surface features, for example, with a deforming mechanism, air or fluid pockets, local deformation of materials, resonant mechanical elements, piezoelectric materials, micro-electromechanical systems ("MEMS") elements, thermal fluid pockets, MEMS pumps, variable porosity membranes, or laminar flow modulation.

In some embodiments, an electrostatic actuator may be used to generate a haptic effect by stimulating parts of the body near or in contact with the touch surface 116. For example, in some embodiments, an electrostatic actuator may stimulate the nerve endings in the skin of a user's finger or components in a stylus that can respond to the electrostatic actuator. The nerve endings in the skin, for example, may be stimulated and sense the electrostatic actuator (e.g., the capacitive coupling) as a vibration or some more specific sensation. For example, in one embodiment, a conducting layer of an electrostatic actuator may receive an AC voltage signal that couples with conductive parts of a user's finger. As the user touches the touch surface 116 and moves his or her finger on the touch surface, the user may sense a texture of prickliness, graininess, bumpiness, roughness, stickiness, or some other texture.

Turning to memory 104, exemplary program components 124, 126, and 128 are depicted to illustrate how a device can be configured in some embodiments to provide user generated content authoring. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure, and/or other characteristics of the touch over time.

Haptic effect determination module 126 represents a program component that analyzes data regarding touch characteristics to select a haptic effect to generate. For example, in one embodiment, module 126 comprises code that determines, based on the location of the touch, a haptic effect to generate. For example, haptic effect determination module 126 may comprise one or more preloaded haptic effects, which may be selected by the user. These haptic effects may comprise any type of haptic effect that haptic output device(s) 118 are capable of generating. Further, in some embodiments, module 126 may comprise program code configured to manipulate characteristics of a haptic effect, e.g., the effect's intensity, frequency, duration, duty cycle, or any other characteristic associated with a haptic effect. In some embodiments, module 126 may comprise program code to allow the user to manipulate these characteristics, e.g., via a graphical user interface.

Further, in some embodiments, module 126 may comprise program code configured to determine haptic effects based on user interactions. For example, module 126 may be configured to monitor user input on touch surface 116 or other sensors, such as inertial sensors, configured to detect motion of the mobile device. Module 126 may detect this input and generate a haptic effect based on the input. For example, in some embodiments module 126 may be configured to determine a haptic effect configured to simulate the user interaction.

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of texture and utilize signal processing algorithms to generate an appropriate signal to send to haptic output device 118. As a further example, a desired texture may be indicated along with target coordinates for the haptic effect and an appropriate waveform sent to one or more actuators to generate appropriate displacement of the surface (and/or other device components) to provide the haptic effect. Some embodiments may utilize multiple haptic output devices in concert to output a haptic effect. For instance, a variation in texture may be used to simulate crossing a boundary between a button on an interface while a vibrotactile effect simulates that a button was pressed.

Figure 1B:
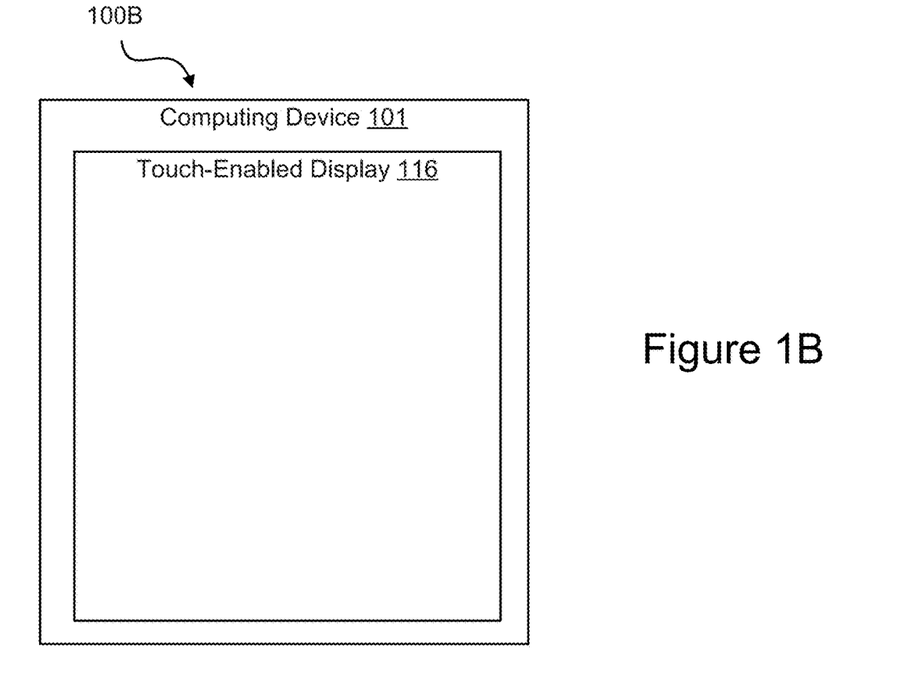
FIG. 1B shows an external view of one embodiment of the system shown in FIG. 1A.

A touch surface may or may not overlay (or otherwise correspond to) a display, depending on the particular configuration of a computing system. In FIG. 1B, an external view of a computing system 100B is shown. Computing device 101 includes a touch enabled display 116 that combines a touch surface and a display of the device. The touch surface may correspond to the display exterior or one or more layers of material above the actual display components.

Figure 1C:
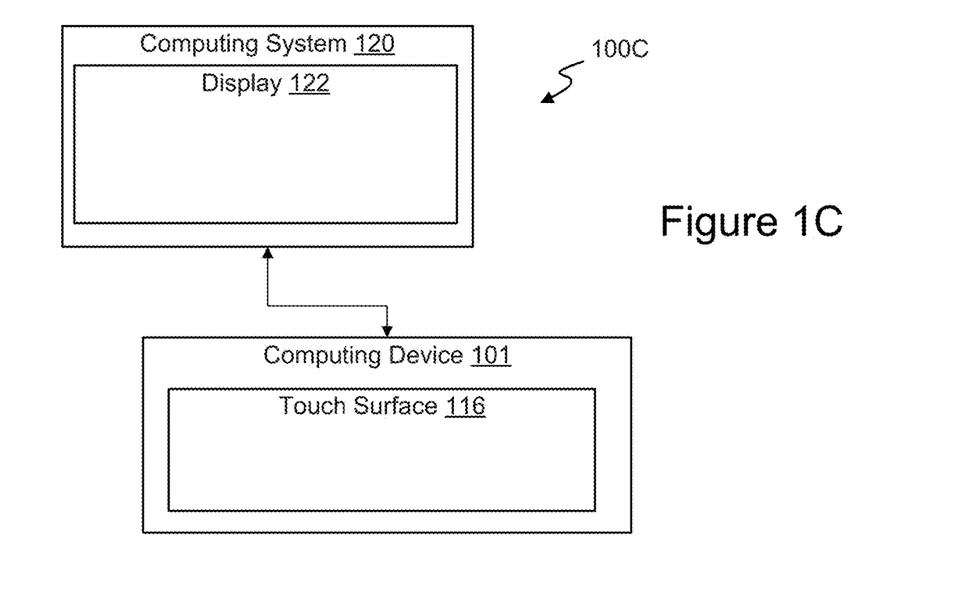
FIG. 1C illustrates an external view of another embodiment of the system shown in FIG. 1A.

FIG. 1C illustrates another example of a touch enabled computing system 100C in which the touch surface does not overlay a display. In this example, a computing device 101 features a touch surface 116 which may be mapped to a graphical user interface provided in a display 122 that is included in computing system 120 interfaced to device 101. For example, computing device 101 may comprise a mouse, trackpad, or other device, while computing system 120 may comprise a desktop or laptop computer, set-top box (e.g., DVD player, DVR, cable television box), or another computing system. As another example, touch surface 116 and display 122 may be disposed in the same device, such as a touch enabled trackpad in a laptop computer featuring display 122. Whether integrated with a display or otherwise, the depiction of planar touch surfaces in the examples herein is not meant to be limiting. Other embodiments include curved or irregular touch enabled surfaces that are further configured to provide surface-based haptic effects.

Figure 2A:
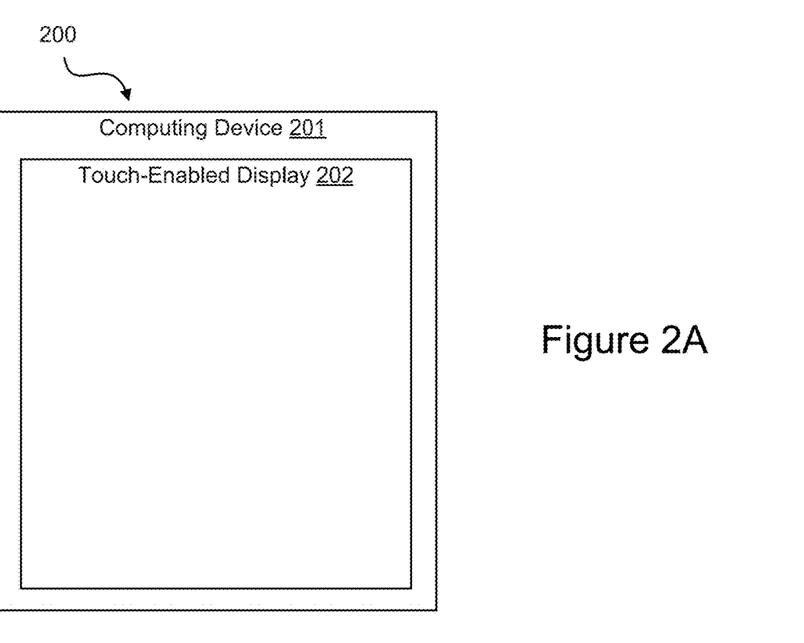
FIG. 2A illustrates an example embodiment for user generated content authoring.
Figure 2B:
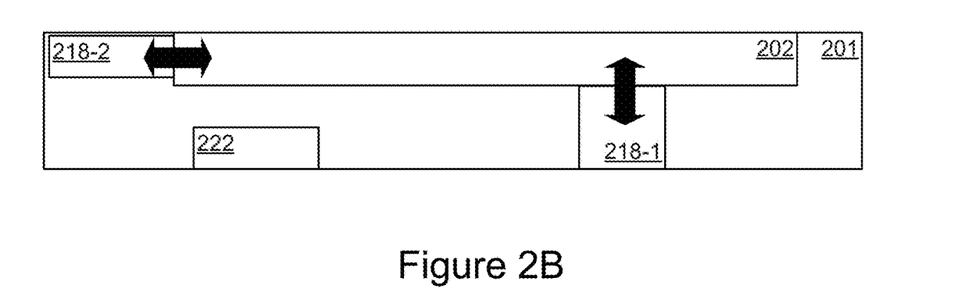
FIG. 2B illustrates another example embodiment for user generated content authoring.

FIGS. 2A-2B illustrate an example embodiment of a device for user generated content authoring. FIG. 2A is a diagram illustrating an external view of a system 200 comprising a computing device 201 that features a touch enabled display 202. FIG. 2B shows a cross-sectional view of device 201. Device 201 may be configured similarly to device 101 of FIG. 1A, though components such as the processor, memory, sensors, and the like are not shown in this view for purposes of clarity.

As can be seen in FIG. 2B, device 201 features a plurality of haptic output devices 218 and an additional haptic output device 222. Haptic output device 218-1 may comprise an actuator configured to impart vertical force to display 202, while 218-2 may move display 202 laterally. In this example, the haptic output devices 218, 222 are coupled directly to the display, but it should be understood that the haptic output devices 218, 222 could be coupled to another touch surface, such as a layer of material on top of display 202. Furthermore, it should be understood that one or more of haptic output devices 218 or 222 may comprise an electrostatic actuator, as discussed above. Furthermore, haptic output device 222 may be coupled to a housing containing the components of device 201. In the examples of FIGS. 2A-2B, the area of display 202 corresponds to the touch area, though the principles could be applied to a touch surface completely separate from the display.

In one embodiment, haptic output devices 218 each comprise a piezoelectric actuator, while additional haptic output device 222 comprises an eccentric rotating mass motor, a linear resonant actuator, or another piezoelectric actuator. Haptic output device 222 can be configured to provide a vibrotactile haptic effect in response to a haptic signal from the processor. The vibrotactile haptic effect can be utilized in conjunction with surface-based haptic effects and/or for other purposes. For example, each actuator may be used in conjunction to simulate a texture on the surface of display 202.

In some embodiments, either or both haptic output devices 218-1 and 218-2 can comprise an actuator other than a piezoelectric actuator. Any of the actuators can comprise a piezoelectric actuator, an electromagnetic actuator, an electroactive polymer, a shape memory alloy, a flexible composite piezo actuator (e.g., an actuator comprising a flexible material), electrostatic, and/or magnetostrictive actuators, for example. Additionally, haptic output device 222 is shown, although multiple other haptic output devices can be coupled to the housing of device 201 and/or haptic output devices 222 may be coupled elsewhere. Device 201 may feature multiple haptic output devices 218-1/218-2 coupled to the touch surface at different locations, as well.

Figure 3A:
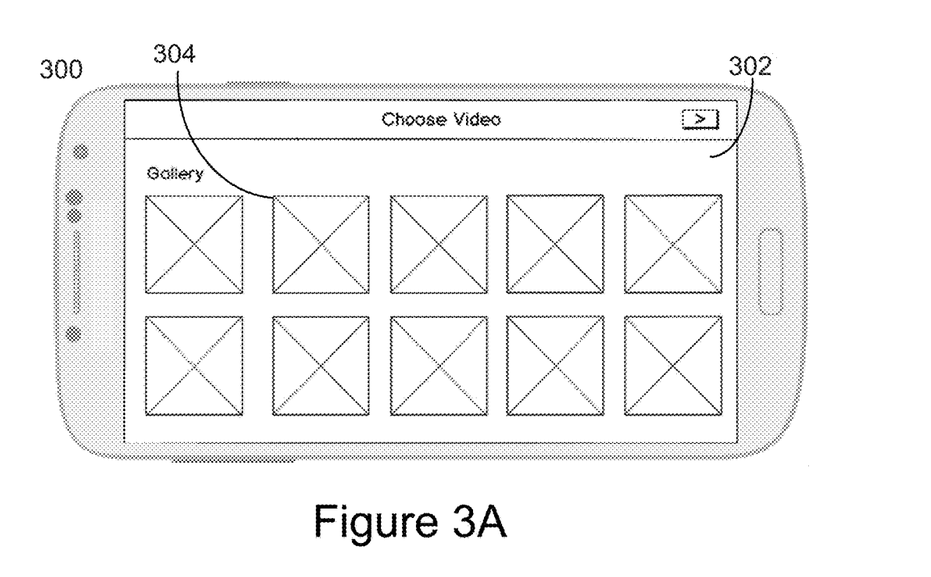
FIG. 3A illustrates yet another example embodiment for user generated content authoring.

Turning now to FIG. 3A, FIG. 3A comprises an embodiment for user generated content authoring according to one embodiment of the present disclosure. The embodiment shown in FIG. 3A comprises a computing device 300. As shown in FIG. 3A, computing device 300 comprises a touch-screen display 302. Further, as shown in FIG. 300, multiple videos 304 are available for user selection. Videos 304 may comprise any number of videos available, such as videos stored locally, videos stored on a remote database (e.g., an Internet accessible database), a private database, videos captured using a camera available on computing device 300, or some other type of video.

In the embodiment shown in FIG. 3A, the user may select one or more of the videos 304 by gesturing to interacting with the video. For example, in the embodiment shown in FIG. 3A the user may interact with a video 304 by making a gesture on the touch-screen 302. In other embodiments, the user may interact with a video by selecting it using a computer mouse, touch-pad, or other user interface device. Once the user selects one of the videos the user may apply user generated content to the video using the systems and methods described herein.

Figure 3B:
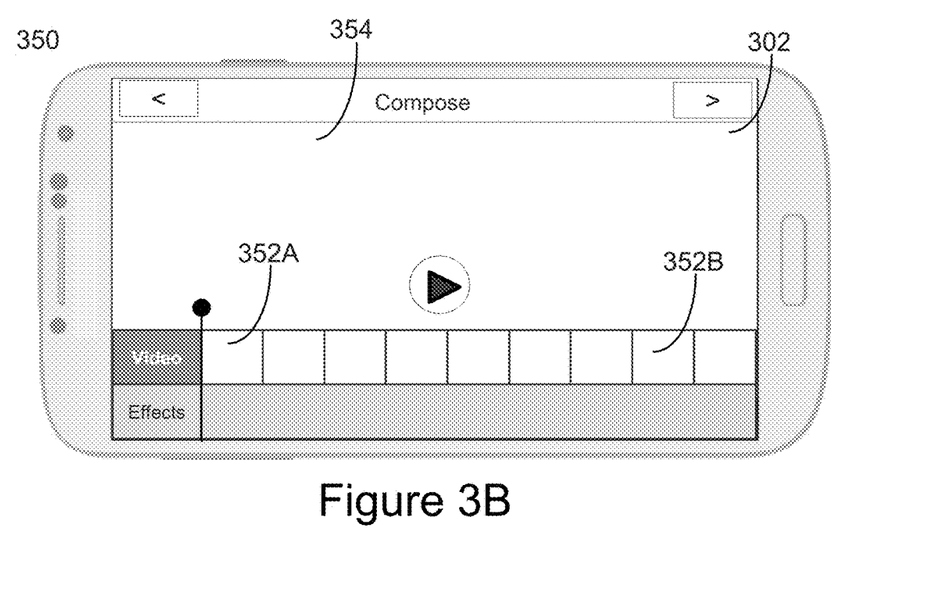
FIG. 3B illustrates yet another example embodiment for user generated content authoring.

FIG. 3B comprises an embodiment for user generated content authoring according to one embodiment of the present disclosure. The embodiment shown in FIG. 3B comprises a computing device 350. As shown in FIG. 3B, computing device 350 comprises a touch-screen display 302. As shown in FIG. 3B, the user has selected one of the available videos and is now applying user generated content.

As shown in FIG. 3B, the mobile device 350 comprises a user interface showing a timeline of video locations 352. In some embodiments, the video locations 352 comprise miniatures of frames within the selected video. Video locations 352A at the right of the touch-screen 302 may comprise locations at the beginning of the video. Video locations 352B at the left of the touch-screen may comprise locations toward the end of the video. The user may make a gesture to select a video location 352 in order to place a haptic effect. As the user selects a video location the display area 354 may show a larger image of that location within the video. Once the user selects a location the user may apply user generated content, such as haptic effects, to that location in the video using the systems and methods described herein. As shown in FIG. 3B, in some embodiments, this timeline of video locations 352 may overlay the video in the display area 354.

Figure 4A:
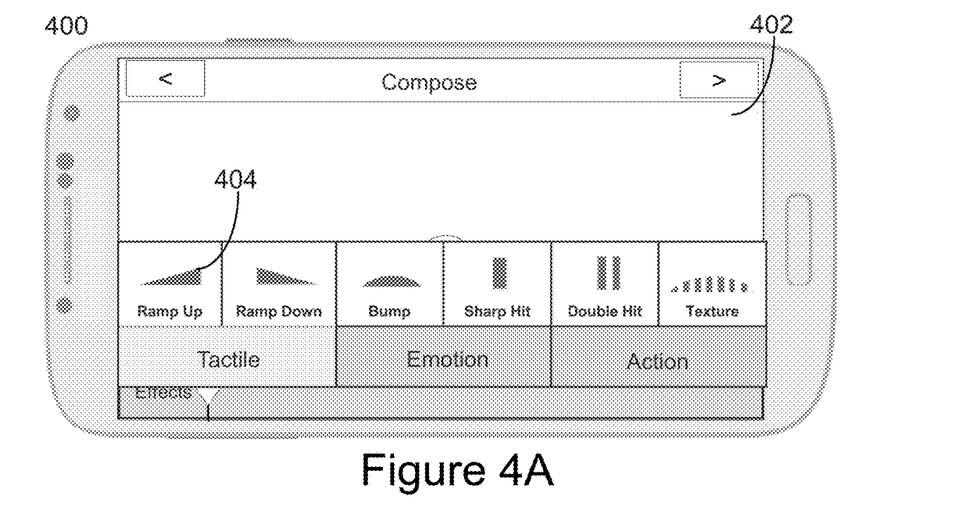
FIG. 4A illustrates yet another example embodiment for user generated content authoring.

FIG. 4A comprises an embodiment for user generated content authoring according to one embodiment of the present disclosure. The embodiment shown in FIG. 4A comprises a computing device 400. As shown in FIG. 4A, computing device 400 comprises a touch-screen display 402. As shown in FIG. 4A, the user has made a gesture to select a location within the video and is now applying a haptic effect. As shown in FIG. 4, the user may select one of example haptic effects 404. For example, the user may make a gesture to interact with the touch-screen 402 at a location associated with the haptic effect 404 to select that haptic effect. Once the user assigns the haptic effect, the effect will be associated with the selected location within the video.

As shown in FIG. 4A, the user may select one of multiple different types of available haptic effects 404. For example, as shown in FIG. 4A, the user may select from broad categories of haptic effects, such as, tactile effects, emotion based effects, or action based effects. Further, these effects may comprise, e.g., ramp up, ramp down, bump, sharp hit, double hit, texture, friction, heartbeat, twinkle, surprise, wow, angel, cheer, whoosh, pop, bam, pow, crash, zap, or some other type of haptic effect that may be generated using vibration, surface based effects, surface deformations, or other types of haptic effects known in the art.

In other embodiments, the user may create a haptic effect. For example, the user may create a haptic effect by gesturing with the device (e.g., shaking the device or pressing a location on the device). This gesture may be captured by one or more sensors (e.g., a heart rate sensor, accelerometer, or a sensor configured to detect motion) on the mobile device and converted to a haptic effect. Further, in some embodiments, the user may apply multiple haptic effects to a single locations or multiple locations throughout the video.

Further, in some embodiments the mobile device 400 may comprise program code to display a user interface configured to allow the user to manipulate characteristics of a haptic effect, e.g., the effect's intensity, frequency, duration, duty cycle, or any other characteristic associated with a haptic effect. This may allow the user to take a pre-existing haptic effect and personalize the effect for a specific video, e.g., a video the user intends to share with other users.

Figure 4B:
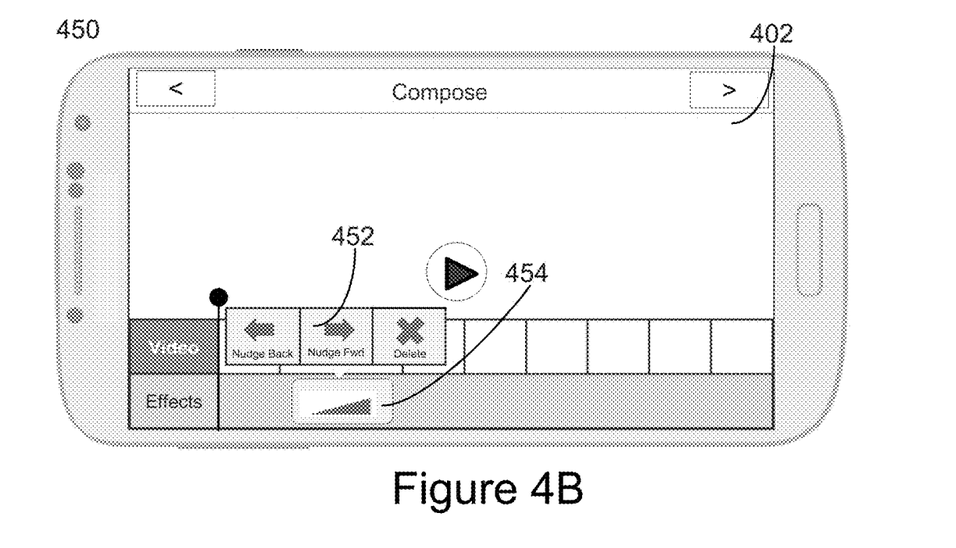
FIG. 4B illustrates yet another example embodiment for user generated content authoring.

FIG. 4B comprises an embodiment for user generated content authoring according to one embodiment of the present disclosure. The embodiment shown in FIG. 4B comprises a computing device 450. As shown in FIG. 4B, computing device 450 comprises a touch-screen display 402. As shown in FIG. 4B, the user has already selected a location within the video and made gestures to place a haptic effect within the video. In the embodiment shown in FIG. 4B, the user can fine tune the location of a haptic effect within the video. For example, as shown in FIG. 4, the user can make gestures 452 to nudge a haptic effect forward (e.g., move the effect forward by a small amount such as 0.2 second) or nudge a haptic effect backward (e.g., move the effect back by a small amount such as 0.2 second). The user can also delete the effect from the video.

Further, as shown in FIG. 4B, a feature 454 shows the duration of the haptic effect by comparison to the length of the video. In the embodiment shown in FIG. 4B, the feature 454 comprises an overlay with a length that matches the haptic effect's duration in comparison to the length of the full video. So, for example, in the embodiment shown in FIG. 4B, the video may comprise a duration that is a multiple of the duration of the effect represented by feature 454. In some embodiments, the user may increase or reduce the duration of the haptic effect and the comparable length of feature 454 may have a corresponding change.

Figure 5A:
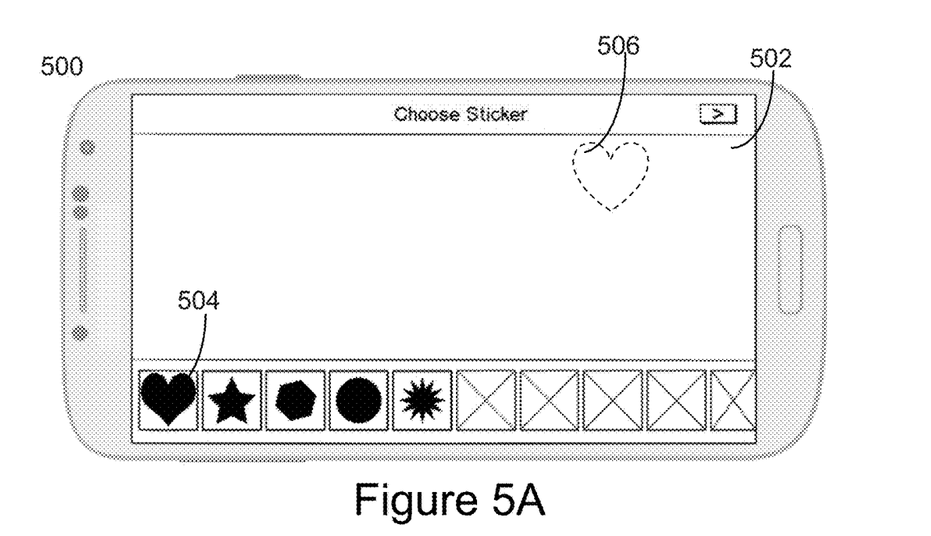
FIG. 5A illustrates yet another example embodiment for user generated content authoring.

FIG. 5A comprises an embodiment for user generated content authoring according to one embodiment of the present disclosure. The embodiment shown in FIG. 5A comprises a computing device 500. As shown in FIG. 5A, computing device 500 comprises a touch-screen display 502. In the embodiment shown in FIG. 5A the user is applying a sticker or tag to a location in the video. The sticker may comprise an animation or a graphic that was already created and available to the user via the content authoring interface. These stickers are shown as stickers 504 in FIG. 5A. In some embodiments, the sticker may comprise a graphic or animation created by the user, or optionally an audio effect. For example, the user may enter a separate drawing mode in which the user may draw a new sticker 506, e.g., with a plugin to a drawing application, or modify an existing sticker, e.g., by adding text or animation to a sticker.

In the embodiment shown in FIG. 5, the user may apply the sticker to a location in the video by performing actions similar to those the user performed to apply a haptic effect to the video. For example, in the embodiment shown in FIG. 5, the user may apply a heart shaped sticker to a certain location within the video. In some embodiments this location may be the same location as an associated haptic effect. For example, the user may apply a heart shaped sticker and also a haptic effect configured to simulate a beating heart at the same location in the video. In other embodiments, the user may apply the sticker at locations that are not also associated with a haptic effect. Further, in some embodiments, the user may apply multiple stickers at locations that may or may not be associated with a corresponding haptic effect.

Figure 5B:
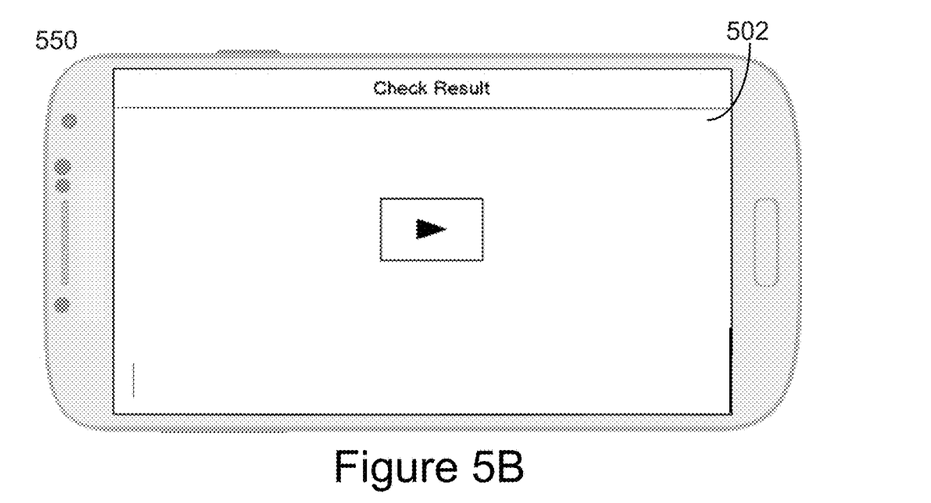
FIG. 5B illustrates yet another example embodiment for user generated content authoring.

FIG. 5B comprises an embodiment for user generated content authoring according to one embodiment of the present disclosure. The embodiment shown in FIG. 5B comprises a computing device 550. As shown in FIG. 5B, computing device 550 comprises a touch-screen display 502. In the embodiment shown in FIG. 5B, the user has already selected and assigned one or more haptic effects and one or more stickers. In the embodiment shown in FIG. 5B, the user may then view the video. At the assigned locations within the video the computing device 550 will output haptic effects and display the stickers. Further, in some embodiments, the user may share the video and associated haptic data. For example, in one embodiment, the user may share a video file comprising embedded haptic data. In another embodiment, the user may share a video file, and also share a haptic track comprising the haptic data.

Illustrative Methods for User Generated Content Authoring

Figure 6:
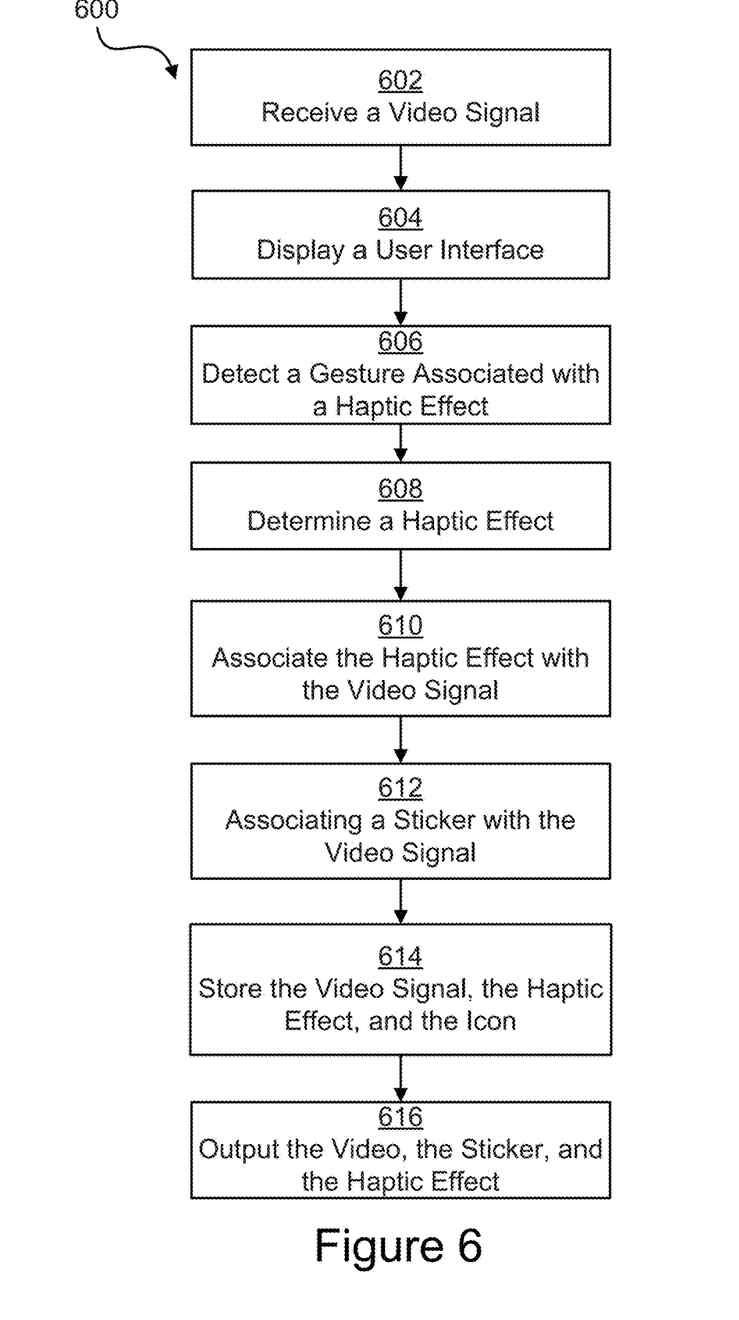
FIG. 6 is a flow chart of method steps for one example embodiment for user generated content authoring.

FIG. 6 is a flow chart of steps for performing a method for user generated content authoring according to one embodiment. In some embodiments, the steps in FIG. 6 may be implemented in program code that is executed by a processor, for example, the processor in a general purpose computer, a mobile device, or a server. In some embodiments, these steps may be implemented by a group of processors. In some embodiments one or more steps shown in FIG. 6 may be omitted or performed in a different order. Similarly, in some embodiments, additional steps not shown in FIG. 6 may also be performed. The steps below are described with reference to components described above with regard to computing device 100 shown in FIG. 1.

The method 600 begins at step 602, when the computing device 100 receives a video signal. The video signal may comprise a video signal received from a remote database (e.g., an internet accessible database), a video signal stored locally, e.g., on a data store such as memory 104 or storage 114, or a video captured using a camera on computing device 101.

Next, the processor 102 displays a user interface 604. In some embodiments, the processor may display the user interface on a display, such as a touch-screen display, of the computing device 101. The user interface may comprise a touch-enabled user interface of the type described above with regard to FIGS. 3A-5B. The user interface comprises touch enabled functionality to allow for user generated content authoring according to the embodiments described herein. For example, the user interface comprises an interface for video selection, haptic effect selection, haptic effect adjustment, haptic effect placement, haptic effect creation, sticker selection, sticker placement, sticker modification, storing a video, and playing a video. In some embodiments, the user may select a video by making a gesture, e.g., a gesture associated with the user interface.

Then the processor 102 detects a gesture associated with a haptic effect 606. In some embodiments, gesture may comprise user input with a touch surface 116. In one embodiment, this gesture may select a preexisting haptic effect, e.g., a gesture on the surface of a touch-screen display. In some embodiments, this gesture may comprise a gesture detected by one or more of sensor(s) 108 and converted to a haptic effect by processor 102. As discussed above, the device may comprise one or more sensors configured to detect movement of the mobile device and sensors configured to detect surface interaction. The user may make a gesture on the surface of the device (e.g., touch, tap, or swipe) the user may also make a gesture with the device (e.g., moving a device through space, tilting, turning, swinging, or spinning, the device etc.). These gestures may be captured by the sensors. The sensors may then transmit signals associated with the gestures to a processor. Further, in some embodiments the gesture may comprise a gesture captured by a camera of the device (e.g., a front or rear facing camera on a mobile device or a remote camera). The camera may capture this gesture and transmit a signal associated with the gesture to the processor 102. As discussed further with regard to step 608, the processor may determine one or more haptic effects configured to simulate the gesture.

Next the processor determines a haptic effect 608. In some embodiments, the processor 102 may determine a haptic effect based on user selection. For example, as discussed with regard to FIG. 4A the user may select an available haptic effect. For example, a data store of computing device 101 may comprise data associated with multiple haptic effects, which the user may select. Further, the user may adjust characteristics associated with the haptic effect. For example, the user may modify the duration, frequency, intensity, or some other characteristic associated with the haptic effect. In some embodiments, the processor 102 may automatically select the haptic effect. For example, in some embodiments, the processor 102 may select a haptic effect associated with events occurring within the video. These events may comprise visual events or audio events. For example, the processor 102 may associated a haptic effect with action events occurring, e.g., in a video of a downhill skier the processor 102 may determine haptic effects associated with each of the skier's collisions. Alternatively, the processor may detect a sharp sound associated with the video, e.g., the opening gun firing in a skiing video, and associate a haptic effect with this sound.

In some embodiments the processor 102 may determine the haptic effect based on the images in a video signal, without taking into account audio in the video signal. In other embodiments, the processor 102 may use the audio in the signal to determine the haptic effect, without using the image components of the video signal. In some embodiments, the processor 102 may use both the visual and audible portions of the video signal. Further, in some embodiments, the processor 102 may receive separate audio and video streams and use both together or separately to determine the haptic effect.

In some embodiments, the processor 102 may create a new haptic based on the gesture. For example, the user may create a haptic effect by interacting with the device (e.g., shaking the device or pressing a location on the device). This interaction may be captured by one or more sensor(s) 108 on the mobile device and converted to a haptic effect. For example, in one embodiment a user may create a new haptic effect by shaking the device vigorously. This shaking may be detected by an inertial sensor. The processor 102 may use a signal from the inertial sensor to determine a haptic effect configured to simulate the device being shaken vigorously. In some embodiments, the processor 102 determines a haptic effect based on a characteristic associated with the user interaction. For example, the processor 102 may determine the haptic effect based the type, location, duration, or other characteristics of the user interaction. Further, the processor 102 may determine a multidimensional haptic effect. For example, the processor 102 may determine a haptic effect that outputs a force in the Z-plane to simulate a gesture that moved the device downward. Further, the processor may also determine a haptic effect to output in the X or Y planes (e.g., a surface based effect on the surface of a touch-screen) to simulate a gesture on the surface of the touch-screen. In some embodiments, these haptic effects may simulate the feeling of an object in the video (e.g., a sticker added by the user or an object already in the video) moving. For example, the haptic effect may simulate the feeling of an object moving from left to right, up to down, forward to back, tilting while in motion, or moving into or out of the display. In some embodiments these haptic effects may correspond to visual effects on the display, e.g., an animation associated with a sticker in the video.

For example, in one embodiment, the user may create a haptic effect configured to simulate the feeling of an object moving from left to right by the tapping the object on the left side of a touch-screen and then moving the object to the right side of the touch-screen. The processor may determine a haptic configured to simulate the "mass" of the object moving from the left side of the display to the right side of the display.

In some embodiments, the computing device 101 may store associated "haptic profiles" in which a user can determine and save in memory 104 a "profile" of the haptic effects the user would like available. For example, in one embodiment, a user can select from a list of options which haptic effect the user would like to insert in the video.

In some embodiments, the processor 102 may determine the haptic effect based in part haptic output device(s) 118 available on computing device 101. In some embodiments, processor 102 may determine haptic effects based on bandwidth limitations associated with computing device 101. For example, in some embodiments the computing device 101 may comprise only one haptic output device 118. In such an embodiment, processor 102 may determine one haptic effect to be output at a time. In other embodiments computing device 101 may comprise a plurality of haptic output devices 118. In such an embodiments, the processor 102 may determine multiple overlapping haptic effects to be output. Further, in such an embodiments, processor 102 may determine a composite haptic effect that is output by harmonics generated by the combination of two or more haptic effects output at the same time by the haptic output devices 118.

Next, the processor 102 associates the haptic effect with the video signal 610. As discussed above with regard to FIGS. 3B and 4B, the user may select a location within the video to place the haptic effect. This location may be associated with events in the video. For example, the user may select haptic effects to occur at certain times in the video. For example, in the embodiment discussed above in which the video comprises a video of a downhill skier, the user may associate haptic effects with locations in which the skier impacts other objects. These haptic effects may enhance the experience of viewing the video. Further, in some embodiments, the processor 102 may be configured to automatically select locations within the video to place haptic effects. For example, the processor may be configured to detect features such as actions, transitions, movements, or other characteristics associated with the video and place haptic effects at locations associated with those features.

Next, the processor 102 associates a sticker with the video signal 612. As discussed above with regard to FIG. 5A, the user may select a sticker and also select a location in the video in which the sticker will appear. As discussed above, the user may select a preexisting sticker. Alternatively, the user may create a new sticker. For example, the processor may display an interface for creating a new sticker. This interface may comprise features for drawing and modifying the sticker. Further, in some embodiments, the user may modify an existing sticker by applying text, animations, or other features to the sticker.

Next, the processor 102 stores the video signal, haptic effect, and the stickers 614. In some embodiments the processor may store each of these components into a single file, e.g., a MP4 file. In other embodiments, any known video file format may be used, e.g., MP2 transport stream, HD livestream, one or more types of MPEG, or other video format known in the art. In some embodiments, the processor may store the video signal, haptic effects, and stickers in separate files. For example, the processor may create a haptic track that is synched to the video file.

Then, the processor 102 outputs the video, the sticker, and the haptic effect 616. The video and the sticker may be output using the display. In some embodiments, the sticker may comprise an animated sticker that moves within the video during playback. In other embodiments, the sticker may comprise a fixed sticker that does not move, e.g., the sticker may comprise a text box.

To output the haptic effect the processor 102 may transmit a haptic signal associated with the haptic effect to haptic output device 118, which outputs the haptic effect. The haptic effect may comprise a texture (e.g., sandy, bumpy, or smooth), a vibration, a change in a perceived coefficient of friction, a change in temperature, a stroking sensation, an electro-tactile effect, or a deformation (i.e., a deformation of a surface associated with the computing device 101).

Additionally or alternatively, in some embodiments, the computing device 101 may output a sound and/or information on a display. The sound and/or information may be associated with a characteristic of the object and/or a function.

Advantages of User Generated Content Authoring

There are numerous advantages of user generated content authoring. For example, tactile enhancement to videos may open avenues for creative content creation. Animated stickers or combination of tactile-only and enhanced animated stickers may further provide additional outlets for user expression in video creation. Further, the use of tactile enhancement as an additional feature added to animated overlay concepts (e.g. animated sticker within a movie) can further increase the user experience.

Some embodiments of the present disclosure can be implemented as a component of third-party application or a component of an on-device application. In some embodiments, the systems and methods disclosed herein are also compatible across devices, for example, a video or a haptic track may be platform independent and therefore able to be played on any device once created.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method for content authoring comprising:
   receiving a video signal associated with a video;
   displaying an image associated with the video on a touchscreen display;
   displaying a user interface associated with haptic authoring on the touchscreen display, wherein the user interface comprises the image and a timeline associated with the video, the timeline comprising a sequence of frames from the video indicating a plurality of video locations, the timeline positioned overtop of the image;
   displaying a plurality of graphical representations of haptic effects overtop of the timeline;
   detecting a gesture for selection of a video location of the video from the plurality of video locations;

detecting a gesture a for selection of a haptic effect from the plurality of graphical representations of haptic effects and applying the selected haptic effect to the selected video location of the video;

displaying a graphical representation of the selected haptic effect overtop of the timeline, wherein a length of the graphical representation corresponds to a duration of the selected haptic effect; and displaying a tool overtop of the timeline for adjusting a location in time in the video of the selected haptic effect.

2. The method of claim 1, wherein the video signal comprises a signal received from a camera on a mobile device.

3. The method of claim 1, further comprising storing the video signal and the selected haptic effect in a single media file.

4. The method of claim 1, further comprising storing the video signal and the selected haptic effect in separate files.

5. The method of claim 1, further comprising associating a sticker with the video signal.

6. The method of claim 5, wherein the sticker comprises a user selected sticker.

7. The method of claim 5, further comprising storing the sticker, the video signal, and the selected haptic effect in a single file.

8. A system for content authoring comprising
a touchscreen display configured to receive a video signal associated with a video;
a processor in communication with the touchscreen display, the processor configured to:
  display an image associated with the video on the touchscreen display;
  display a user interface associated with haptic authoring, wherein the user interface comprises the image and a timeline associated with the video, the timeline comprising a sequence of frames from the video indicating a plurality of video locations, the timeline positioned overtop of the image;
  display a plurality of graphical representations of haptic effects overtop of the timeline;
  detect a gesture for selection of a video location of the video from the plurality of video locations;
  detect a gesture for selection of a haptic effect from the plurality of graphical representations of haptic effects and applying the selected haptic effect to the selected video location of the video;
  display a graphical representation of the selected haptic effect overtop of the timeline, wherein a length of the graphical representation corresponds to a duration of the selected haptic effect; and
  display a tool overtop of the timeline for adjusting a location in time in the video of the selected haptic effect.

9. The system of claim 8, further comprising a camera configured to capture an image and wherein the video signal is associated with the image.

10. The system of claim 8, further comprising storing the video signal and the selected haptic effect in a single media file.

11. The system of claim 8, wherein the processor is further configured to associate a sticker with the video signal.

12. The system of claim 11, wherein the sticker comprises a user selected sticker.

13. The system of claim 12, wherein the processor is further configured to store the sticker, the video signal, and the selected haptic effect in a single file.

14. The system of claim 8, further comprising a haptic output device in communication with the processor.

15. The system of claim 14, wherein the haptic output device comprises one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

16. A non-transitory computer readable medium comprising program code, which when executed by a processor is configured to cause the processor to:
  display an image associated with a video on a touchscreen display;
  display a user interface associated with haptic authoring, wherein the user interface comprises the image and a timeline associated with the video, the timeline comprising a sequence of frames from the video indicating a plurality of video locations, the timeline positioned overtop of the image;
  display a plurality of graphical representations of haptic effects overtop of the timeline;
  detect a gesture for selection of a video location of the video from the plurality of video locations;
  detect a gesture for selection of a haptic effect from the plurality of graphical representations of haptic effects and applying the selected haptic effect to the selected video location of the video;
  display a graphical representation of the selected haptic effect overtop of the timeline, wherein a length of the graphical representation corresponds to a duration of the selected haptic effect; and
  display a tool overtop of the timeline for adjusting a location in time in the video of the selected haptic effect.

* * * * *

UNITED STATES PATENT AND TRADEMARK OFFICE
CERTIFICATE OF CORRECTION

PATENT NO. : 10,437,341 B2
APPLICATION NO. : 14/596569
DATED : October 8, 2019
INVENTOR(S) : David M. Birnbaum et al.

Page 1 of 1

It is certified that error appears in the above-identified patent and that said Letters Patent is hereby corrected as shown below:

On the Title Page

Page 2, (56) under Foreign Patent Documents:
"JP 2008/090859" should be "WO 2008/090859".

In the Specification

Column 14, Line 66 "new haptic based" should be "new haptic effect based"

In the Claims

Column 19, Line 1 in Claim 1, "detecting a gesture a for" should be "detecting a gesture for"

Signed and Sealed this
Third Day of December, 2019

Andrei Iancu
*Director of the United States Patent and Trademark Office*